H. A. DUC.
LUBRICATOR.
APPLICATION FILED SEPT. 16, 1913.
1,138,942.
Patented May 11, 1915.
3 SHEETS—SHEET 1.
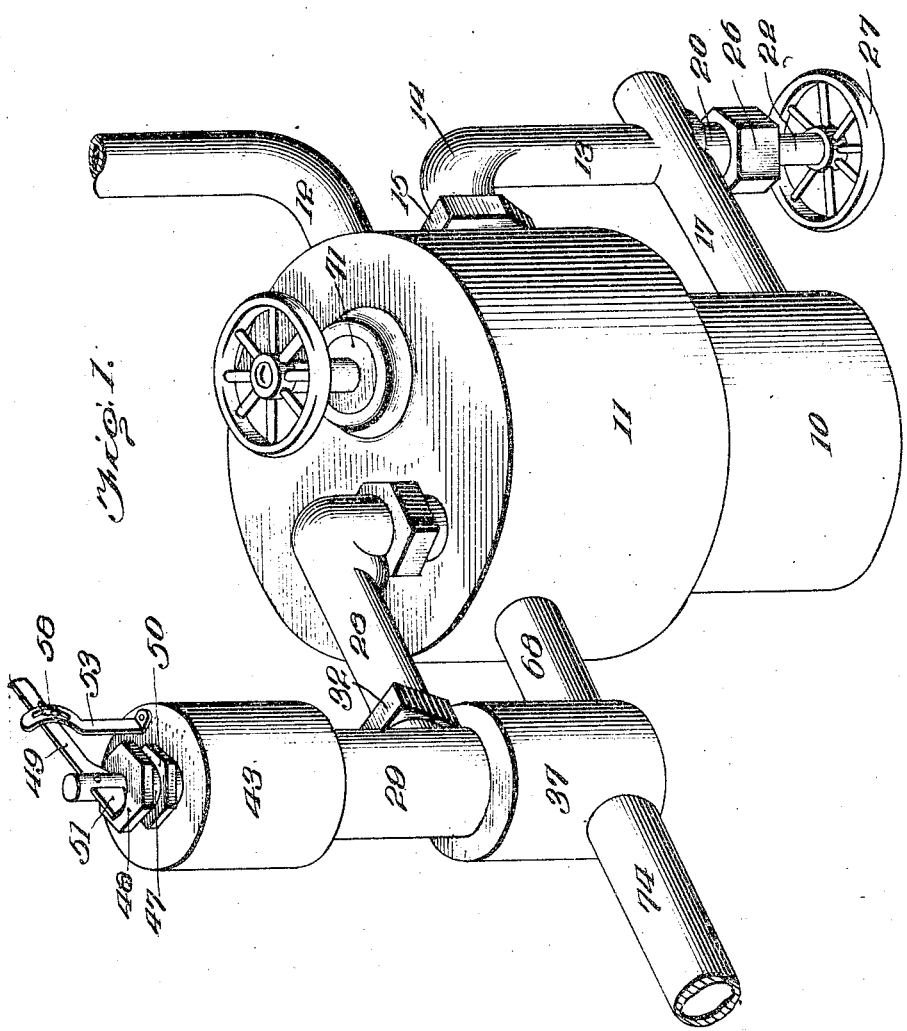
Witnesses
Inventor
H. A. Duc.
By _____, Attorneys

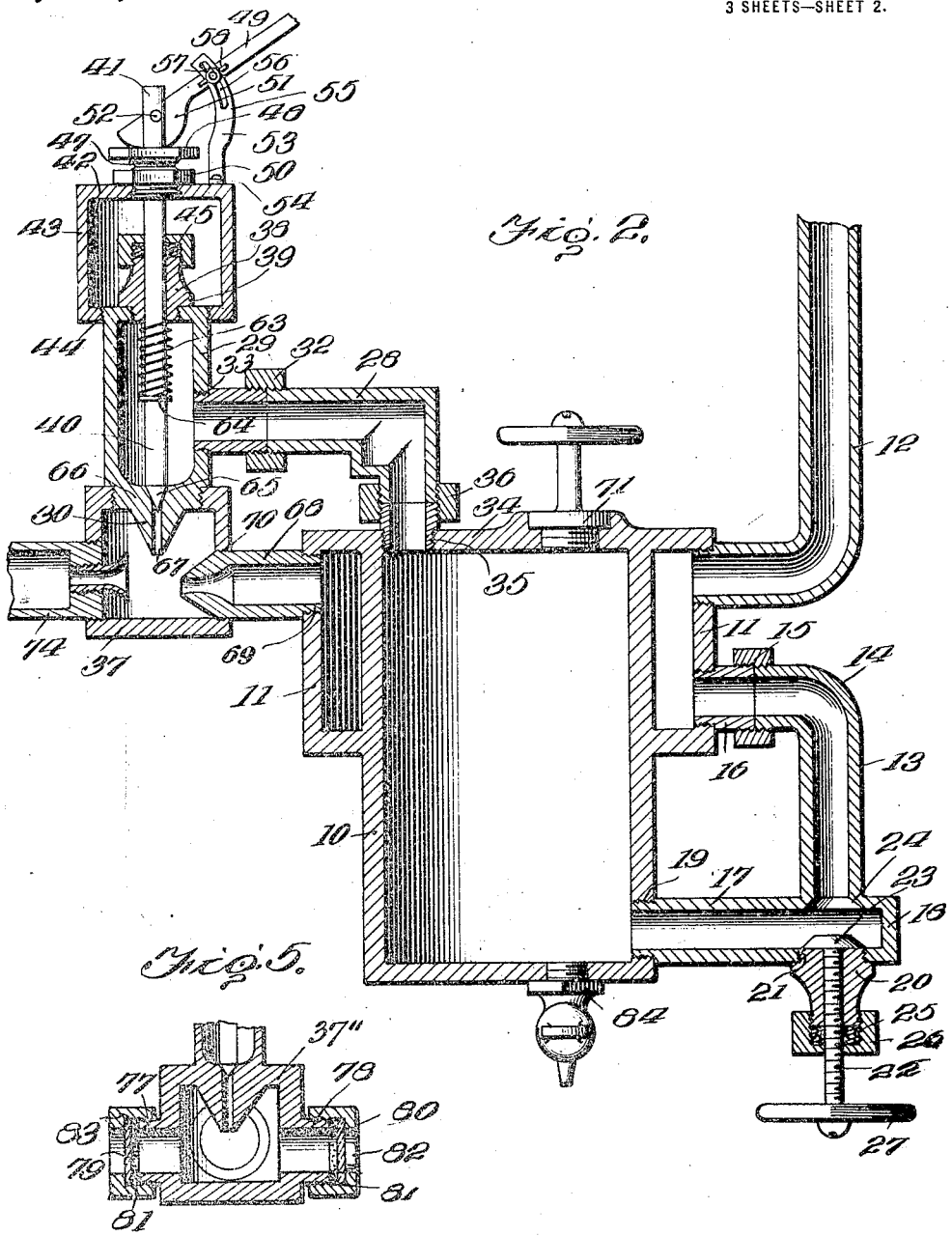

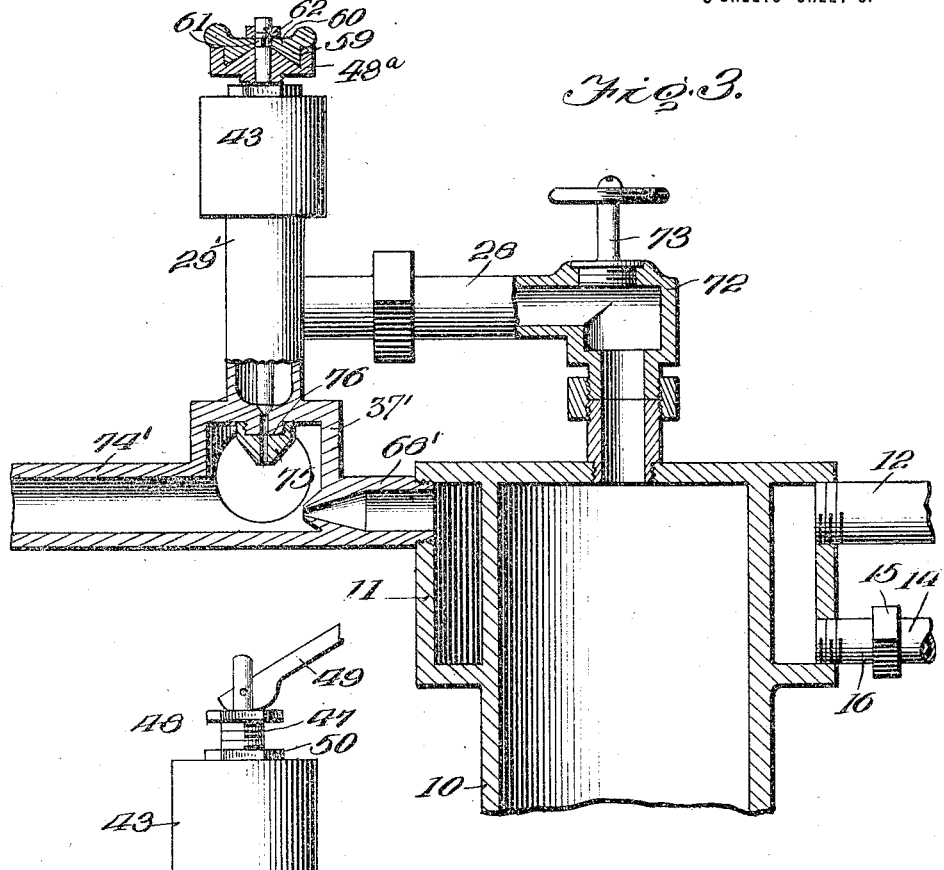
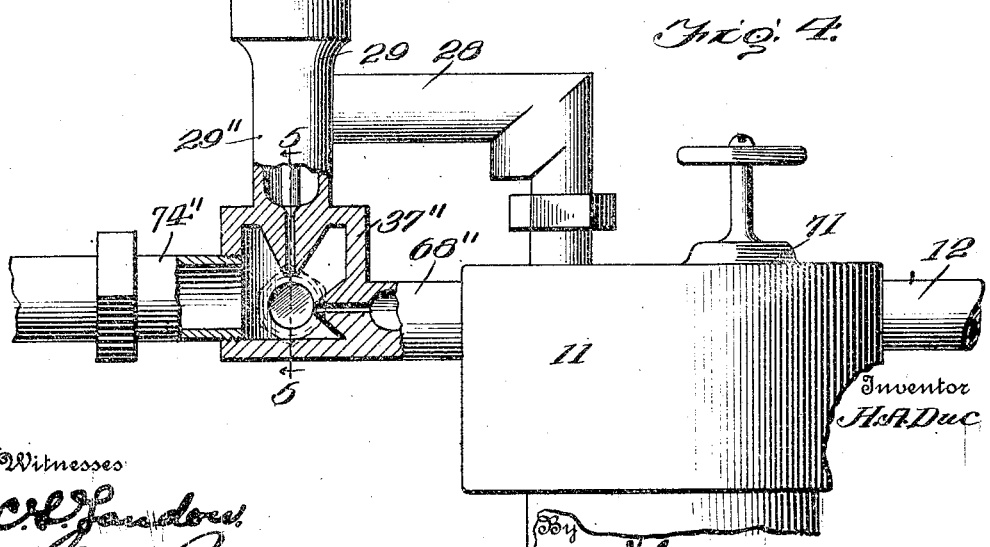

UNITED STATES PATENT OFFICE.

HENRY A. DUC, OF CHARLESTON, SOUTH CAROLINA.

LUBRICATOR.

1,138,942.   Specification of Letters Patent.   Patented May 11, 1915.

Application filed September 16, 1913. Serial No. 790,049.

*To all whom it may concern:*

Be it known that I, HENRY A. DUC, citizen of the United States, residing at Charleston, in the county of Charleston and State of South Carolina, have invented certain new and useful Improvements in Lubricators, of which the following is a specification.

This invention relates broadly to lubricating systems and has particular reference to those of the force feed type.

Primarily this invention provides a force feed lubricating system in which the lubricant is circulated from the main reservoir through the oil ducts and glands by a water of condensation displacement in the lubricant reservoir.

As one of its principal objects this invention aims to provide a system of the class described in which the lubricant is mixed with steam prior to its entrance into the engine or system to be lubricated, producing an emulsion.

An object of equal importance with the foregoing is to provide means whereby the proportion of steam and lubricant in the emulsion may be quickly varied to make the emulsion heavy or light as conditions may demand.

A yet further object resides in the provision of a device for controlling the quantity of lubricant displaced from the reservoir per unit of time.

A still further object resides in the provision of a mixing chamber into which the lubricant and steam are directed at an angle to one another so that they will thoroughly mix, producing a temporary emulsion.

A yet further object is to provide a novel form of control for the valve which is introduced in the lubricant inlet of the mixing chamber.

A still further object resides in the provision of a steam jacketed lubricant reservoir whereby the temperature of the lubricant is raised to the desired point prior to its entrance into the mixing chamber in which it contacts with the steam.

Another object is to construct the device in such manner that the steam after passing through the jacket surrounding the lubricant reservoir may be directed into the mixing chamber to commingle with the lubricant which enters the mixing chamber by another course.

An object coexisting in importance with all of the foregoing is to construct the device of this invention with such regard to proportion, number and arrangement of parts that it may be cheaply manufactured, will be durable and efficient in its action, will be equipped with as few adjustments as are consistent with the desideration of adequate control over the quality of the prepared emulsion and may be readily applied to any standard form of steam engine or machine adapted to force feed lubrication.

The above and additional objects are accomplished by such means as are illustrated in the accompanying drawings, described in the following specification, and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is an exterior perspective view of the preferred form of the lubricating device; Fig. 2 is a vertical medial section of the device as shown in Fig. 1; Fig. 3 is a sectional view illustrating a modified form of structure; Fig. 4 is a detail view disclosing still another modification, the mixing chamber being shown in section to more clearly illustrate the interior arrangement of parts; Fig. 5 is a section on the line 5—5 of Fig. 4.

In its preferred form this invention consists essentially in a lubricant reservoir or container which is partially surrounded by a steam jacket and communicates with a mixing chamber into which the steam is directed after passing through the steam jacket.

The lubricant reservoir of the preferred form as best illustrated in detail in Fig. 2, comprises a cylindrical casing 10 formed of cast brass or any other desired and suitable metal. The upper portion of the casing 10 is surrounded by a steam jacket 11 into which the steam enters by a pipe indicated at 12. This pipe 12 is tapped into the wall of the steam jacket 11 at the upper end thereof, there being an additional feed pipe 13 tapped into the steam jacket at the lower portion thereof. These pipes 12 and 13 are both screw threaded into the steam jacket wall so that they may be readily applied or detached in case of repairs. The pipe 13 is formed with an elbow indicated at 14 and is terminally screw threaded to receive a lock nut 15 by which it is connected to a coupling pipe 16. A branch pipe 17 is cast with the lower terminal of the pipe 13 being closed at one end by a wall 18 and screw threaded at the other end as at 19 so that it may be connected to the lubricant casing 10 at the lower portion thereof. The under part of the pipe 17 is provided with a threaded bore adapted to receive a valve supporting body 20 which in the preferred embodiment consists of a metallic plug formed with an annular shoulder or flange 21 adapted to bear against the pipe 17. The member 20 is formed with a longitudinally extending threaded bore which receives a threaded valve stem 22 in the inner end of which is carried a valve head 23 preferably of conical shape and adapted to seat in a valve seat 24 formed at the juncture of the pipes 13 and 17. A packing gland 25 surrounds the valve stem 22 and is held in position by a threaded bushing 26 as will be readily observed upon reference to Fig. 2. A wheel or similar device is secured to the outer terminal of the valve stem 22 as indicated at 27 for an obvious purpose.

As previously set forth the steam enters the steam jacket 11 through the pipe 12. It will be observed that inasmuch as this steam pipe 12 enters the water jacket at its upper portion all water of condensation will collect in the lower part of the steam jacket and will pass through the pipes 13 and 17 into the casing 10 at the lower portion thereof. Inasmuch as this water of condensation will be under pressure of the steam head in the pipe 12 it is apparent that the lubricant will be forced toward the upper end of the casing 10. In this connection it is to be noted that the volume of water of condensation entering the casing 10 and consequently the pressure bearing on the lubricant and tending to force it toward the upper end of the casing 10, may be controlled by manipulation of the valve 23.

The lubricant passes from the casing 10 through a lead pipe 28 into a valve casing 29 from which it exits through a nozzle 30 into the mixing chamber indicated at 37. The pipe 28 in the preferred embodiment is L-shaped and is externally threaded at both ends, the horizontal portion of the pipe being formed in two sections which are held in assembled position by a lock nut 32. The horizontal portion of the pipe 28 is threaded into the valve casing 29 as indicated at 33, while the lower terminal of the vertical portion of the pipe is threaded into the upper closure wall 34 of the casing 10 as indicated at 35. This vertical portion of the pipe 28 is also formed in two sections in the preferred embodiment, these two sections being held in assembled relation by a lock nut indicated at 36.

The valve casing 29 is substantially cylindrical in shape and is screw threaded into the top of the cylindrical casing or barrel 37 which in the preferred form constitutes the mixing chamber. The upper end of this valve casing 29 is externally screw threaded and is further formed with a centrally disposed internally screw threaded opening in which a plug 38 is mounted. An annular shoulder 39 is formed on the plug 38 for an obvious purpose. A valve 40 extends through the valve casing 29 and upwardly through the plug 38, its upper terminal indicated at 41 being passed through the top plate 42 of a cylindrical housing 43 the lower closure plate 44 of which is formed with a screw threaded opening so that it may be maintained in threaded engagement with the upper terminal of the valve casing 29. A packing gland 45 surrounds the valve. In the upper closure member 42 of the member 43 is formed a centrally disposed screw threaded opening which receives the threaded boss 47 formed on a preferably hexagonal face plate 48 on which the head of a cam lever 49 operates as will be hereinafter more fully described. A lock nut 50 is mounted on the boss 47 and is manipulated in an obvious manner to space the face plate 48 the desired distance from the closure 42. The face plate 48 and boss 47 are provided with a vertically extending bore through which the valve stem 40 operates. The upper terminal of this valve stem 40 indicated at 41 is bifurcated and receives between the arms thus produced the cam head 51 of the lever 49. The lever 49 is mounted on a pivot pin 52. The member 51 is arranged in a vertical plane and as indicated is formed with a cam edge which is adapted to engage the face plate 48. It will be apparent upon reference to Fig. 2 particularly that by manipulating the lever 49 the valve stem 40 may be lowered and raised toward and away from its seat.

As a means for holding the lever arm in adjusted position there has been provided a bracket 53 which is bolted or otherwise secured as at 54 to the closure 42 and is bent at its upper terminal to produce an arcuate arm 55. This arm 55 is formed with an arcuate slot 56 in which a pintle 57 carried by the arm 49 operates. A wing nut 58 is applied to the projecting terminal of the pintle 57 and holds the lever arm in the desired adjusted position by clamping the arm against the bracket.

Relative to the adjustment of the valve 40 whereby the volume of lubricant flowing to the mixing chamber 31 is controlled, it is to be noted that by moving the face plate 48 toward and away from the closure 42 the operator may readily vary the point at which the cam 51 will engage the face plate. This feature forms an additional means of controlling the adjustment of the valve 40 as will be obvious upon reference to Fig. 2.

In connection with the preferred form of valve operating means it may be well to interpolate at this point a brief description of a modified form of valve control which may be employed in this invention. This modification is illustrated in Fig. 3 and consists in forming the face plate 48ª with an annular cam faced recess which is concentrically disposed and receives a cam faced projection 59 formed on a wing nut 60. This wing nut 60 is formed with a squared central opening which receives the squared portion 61 of the valve stem and obviously upon rotation raises or lowers the valve. A lock nut 62 is applied to the extreme upper terminal of the valve in the well known manner.

Resuming now the description of the preferred form, it has been found expedient in practice to dispose a helical spring 63 around the portion of the valve 40 which is comprehended within the valve casing. The upper terminal of the spring 63 bears against the plug 38, while the lower terminal is held in position by a collar 64 carried on the valve. The lower terminal of the valve 40 is conical as indicated at 65 and seats in a conical bore formed in the lower closure 66 of the valve casing. A duct 67 communicates with the valve and terminates at its lower end interiorly of the mixing chamber 31. A spray nozzle 68 conducts the steam from the jacket 11 into the mixing chamber, being preferably reduced and screw threaded at its rear terminal as at 69 for connection to the steam jacket. The forward terminal of the member 68 which is projected into the chamber 31 is tapered to produce a substantially conical conformation and is screw threaded at the junction of the conical portion with the main body portion as at 70 for the obvious purpose of threading it into the wall of the casing 37. This nozzle preferably consists in a core casting formed of brass or any other suitable material, the core being gradually reduced toward the outlet so that the steam will be compressed as it enters the mixing chamber and will pass therethrough with increased velocity. It will be apparent upon reference to Fig. 2 particularly that as the lubricant drops from the duct 67 it will fall at right angles to the path of movement of the steam and will be atomized and mixed therewith with the consequent production of a lubricating emulsion. In this connection it is to be noted that the term emulsion is used because of the fact that it is deemed to be particularly descriptive in this connection. In reality, however, the emulsion is only temporary but for all practical purposes it is as permanent as need be inasmuch as the pressure on the emulsion will be maintained through the oil ducts and glands of the system so that the oil globules or particles will be prevented from coagulation.

In the preferred form the lubricant is deposited in the casing 10 through an opening which is formed in the member 34 and is normally closed by a plug 71. In the modification illustrated in Fig. 3 the opening through which the lubricant is poured into the casing 10 is formed in the upper portion of an elbow 72 on the pipe 28 and is closed by a plug 73 similar to the member 71. This modified structure reduces somewhat the cost of manufacture and has been found to be highly desirable in some instances. A further modification disclosed in Fig. 3 consists in casting the valve casing 29', mixing chamber 37', inlet nozzle 68' and outlet pipe 74' integrally and in providing a detachable cap 75 which is screw threaded on a downwardly extending boss 76 formed on the lower portion of the valve casing and equipped with an oil duct communicant with the valve seat. The cap 75 is placed in position and removed through an opening formed in a wall of the chamber, such as is common in fittings of this nature, this opening being closed by a plug, cap or other well-known means. In manufacturing the lubricator of this invention it has been found desirable to provide a set of these removable caps 75 making the individual caps of the set with oil bores or ducts of various diameters so that the user may provide for the issuance of the lubricant into the mixing chamber in large or small drops as conditions may demand.

In the modified form illustrated in Fig. 4 the horizontal portion of the pipe 28 has been cast with the valve casing 37'' and steam inlet pipe 68''. In the modification of Fig. 4 also there has been provided a sight barrel as illustrated particularly in Fig. 5. Upon reference to this figure it will be observed that a pair of externally threaded bosses 77 and 78 have been formed at diametrically opposed points in the casing 37''. The open ends of these bosses 77 and 78 are sealed by glass plates indicated at 79 and 80. A packing gasket 81 is interposed between these glass plates and the adjacent terminal of the bosses 77 and 78 for the obvious purpose of preventing leakage from the mixing chamber. In holding the glasses 79 and 80 in assembled position a pair of threaded caps 82 and 83 are employed. These caps are formed with central openings so that the interior of the mixing chamber is open to view through the glass plates 79 and 80.

A drain cock indicated at 84 is of course provided for the lubricant reservoir container so that the entire system may be bled when necessary.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus described the invention what is claimed as new is:—

1. In a displacement lubricator, a reservoir for the lubricant, a steam jacket surrounding the reservoir, a valved connection between the lower portion of the steam jacket and the lower end of the reservoir, and a mixing chamber having connection with the upper portions of the reservoir and steam jacket.

2. In a displacement lubricator, a reservoir for the lubricant, a steam jacket surrounding the reservoir, a valved connection between the lower portion of the steam jacket and the lower end of the reservoir, a mixing chamber, a nozzle connection between the mixing chamber and the steam jacket, and a connection between the upper portion of the reservoir and the mixing chamber for supplying the lubricant to the mixing chamber at an angle to the jet of steam.

3. In a displacement lubricator, a reservoir for the lubricant, a steam jacket surrounding the reservoir, a valved connection between the lower portion of the steam jacket and the lower end of the reservoir, a mixing chamber, a nozzle connection between the mixing chamber and the steam jacket, and a valved connection between the upper portion of the reservoir and the mixing chamber for supplying the lubricant to the mixing chamber in regulated quantity at an angle to the jet of steam.

4. In a device of the character described, a lubricant reservoir, a mixing chamber, a steam jacket for the reservoir, a nozzle conducting steam from the steam jacket to the mixing chamber, a lubricant controlling valve carried by the mixing chamber, and means for conducting lubricant from the reservoir to the valve, said valve being adapted to introduce the lubricant into the mixing chamber at a point above the level of the line of entrance of the steam.

5. In a device of the character described, a lubricant reservoir, a steam jacket, a mixing chamber, a nozzle conducting steam from the steam jacket to the mixing chamber, a lubricant controlling valve carried by the mixing chamber, and a nozzle carried by the valve and projecting into the mixing chamber for introducing the lubricant above the level of the line of entrance of the steam and at an angle thereto, and means for conducting lubricant from the reservoir to the valve.

6. In a device of the character described, a lubricating reservoir, a steam jacket for the reservoir, a mixing chamber, a nozzle conducting steam from the steam jacket to the mixing chamber, a pipe conducting lubricant from the reservoir to the mixing chamber, and a controlling valve interposed in the pipe, said valve including a casing mounted on the mixing chamber, a nozzle carried by the casing and projecting into the mixing chamber, an exteriorly operable valve rod adapted to seat in the bore of the nozzle, and means for holding the valve rod in adjusted position.

7. In a device of the character described, a lubricant reservoir, a steam jacket for the reservoir, a mixing chamber, a nozzle conducting steam from the jacket to the mixing chamber, a pipe conducting lubricant from the reservoir to the mixing chamber, and a controlling valve interposed in the pipe, said valve including a valve casing having a nozzle projecting into the mixing chamber, a valve rod, means for normally holding the valve in closed position in the bore of the nozzle, and exteriorly operable means for manipulating the valve rod.

8. In a device of the character described, a lubricant reservoir, a steam jacket for the reservoir, a mixing chamber, a nozzle for conducting steam from the steam jacket into the mixing chamber, a pipe conducting lubricant from the reservoir to the mixing chamber, a nozzle communicating with the pipe and leading into the mixing chamber, and a valve for controlling the passage of lubricant through the last-mentioned nozzle whereby the proportions of steam and lubricant of the mixture formed in said mixing chamber may be varied.

In testimony whereof I affix my signature in presence of two witnesses.

HENRY A. DUC. [L. S.]

Witnesses:
R. L. LINDSEY,
T. E. CARRINGTON.